United States Patent
Greene et al.

(10) Patent No.: US 10,672,021 B2
(45) Date of Patent: Jun. 2, 2020

(54) SYSTEM AND METHOD FOR LOCATION-BASED TRAFFICKING FOR RESOURCE ACCUMULATION

(71) Applicant: BANK OF AMERICA CORPORATION, Charlotte, NC (US)

(72) Inventors: Tracy Beth Greene, Mooresville, NC (US); Sean Michael Gutman, Waxhaw, NC (US); Emily Paige Bosin, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 256 days.

(21) Appl. No.: 15/430,013

(22) Filed: Feb. 10, 2017

(65) Prior Publication Data
US 2018/0232756 A1  Aug. 16, 2018

(51) Int. Cl.
| | |
|---|---|
| G06Q 30/02 | (2012.01) |
| H04W 4/02 | (2018.01) |
| H04W 4/12 | (2009.01) |
| H04M 1/72 | (2006.01) |
| H04M 1/725 | (2006.01) |

(52) U.S. Cl.
CPC .... *G06Q 30/0231* (2013.01); *H04M 1/72572* (2013.01); *H04W 4/023* (2013.01); *H04W 4/12* (2013.01); *H04M 2250/52* (2013.01)

(58) Field of Classification Search
USPC .............. 707/E17.108; 455/519; 705/14.58; 463/4, 33; 345/633
See application file for complete search history.

(56) References Cited

U.S. PATENT DOCUMENTS

| | | |
|---|---|---|
| 5,139,286 A | 8/1992 | Gold |
| 6,890,179 B2 | 5/2005 | Rogan et al. |
| 6,970,871 B1 | 11/2005 | Rayburn |
| 7,899,750 B1 | 3/2011 | Klieman et al. |
| 7,997,969 B1 | 8/2011 | Murrell et al. |
| 8,108,304 B2 | 1/2012 | Loeger et al. |
| 8,262,447 B2 | 9/2012 | Murrell et al. |
| 8,296,206 B1 | 10/2012 | Del Favero et al. |

(Continued)

OTHER PUBLICATIONS http://money.usnews.com/money/personal-finance/articles/2012/07/16/the-gamification-of-personal-finance.
https://www.ally.com/do-it-right/money/have-fun-with-finances-level-up-your-finances-using-gamification/.

*Primary Examiner* — Saba Dagnew
(74) *Attorney, Agent, or Firm* — Michael A. Springs; Moore & Van Allen PLLC; Peter B. Stewart

(57) ABSTRACT

Embodiments of the present invention provide a system for location-based trafficking for resource accumulation. The system may monitor location data of a mobile device of a user to determine when the user is within a predetermined distance from a specific geographical location of a resource. The system may then automatically transmit a token alert across a wireless network to the mobile device, activating a resource accumulation application to cause a user interface of the mobile device to display an augmented reality of a camera display that includes a virtual token. In some embodiments, the system determines that some advanced interaction has occurred between the user and a merchant associated with the geographical location of the resource and, in response, provides additional virtual tokens or improves the benefit to the user for one or more virtual tokens.

17 Claims, 6 Drawing Sheets

(56) References Cited

U.S. PATENT DOCUMENTS

| | | |
|---|---|---|
| 8,463,703 B1 | 6/2013 | Bloomquist et al. |
| 8,517,258 B2 | 8/2013 | Taylor et al. |
| 8,770,473 B2 | 7/2014 | Bufford et al. |
| 2002/0128916 A1 | 9/2002 | Beinecke, III |
| 2003/0061093 A1 | 3/2003 | Todd |
| 2003/0069787 A1 | 4/2003 | Tendon et al. |
| 2003/0171992 A1 | 9/2003 | Blagg et al. |
| 2004/0039679 A1 | 2/2004 | Norton et al. |
| 2004/0122736 A1 | 6/2004 | Strock et al. |
| 2004/0238622 A1 | 12/2004 | Freiberg |
| 2004/0243465 A1 | 12/2004 | Manners |
| 2005/0021457 A1 | 1/2005 | Johnson et al. |
| 2005/0154639 A1 | 7/2005 | Zetmeir |
| 2005/0222894 A1 | 10/2005 | Klein et al. |
| 2006/0015390 A1 | 1/2006 | Rijsinghani et al. |
| 2006/0122932 A1 | 6/2006 | Birtwell et al. |
| 2006/0277103 A1 | 12/2006 | Fujita et al. |
| 2007/0078710 A1 | 4/2007 | Bender, II |
| 2007/0094080 A1 | 4/2007 | Wiken |
| 2007/0156530 A1 | 7/2007 | Schmitt et al. |
| 2008/0010151 A1 | 1/2008 | Bridges et al. |
| 2008/0082407 A1 | 4/2008 | Georgiadis et al. |
| 2008/0082418 A1 | 4/2008 | Fordyce et al. |
| 2009/0018916 A1 | 1/2009 | Seven et al. |
| 2009/0144639 A1 | 6/2009 | Nims et al. |
| 2009/0150232 A1 | 6/2009 | Tyler et al. |
| 2009/0181777 A1 | 7/2009 | Christiani et al. |
| 2009/0222358 A1 | 9/2009 | Bednarek |
| 2009/0248509 A1 | 10/2009 | Hamaoui et al. |
| 2010/0010964 A1* | 1/2010 | Skowronek ............ G06Q 30/02 707/E17.108 |
| 2010/0088148 A1 | 4/2010 | Presswala et al. |
| 2010/0106580 A1 | 4/2010 | Etheredge et al. |
| 2010/0145718 A1 | 6/2010 | Elmore et al. |
| 2010/0250419 A1 | 9/2010 | Ariff et al. |
| 2010/0274658 A1 | 10/2010 | Celli et al. |
| 2010/0280896 A1 | 11/2010 | Postrel |
| 2010/0287046 A1 | 11/2010 | Bennett et al. |
| 2010/0312620 A1 | 12/2010 | White et al. |
| 2011/0004558 A1 | 1/2011 | MacLean et al. |
| 2011/0028160 A1 | 2/2011 | Roeding et al. |
| 2011/0034240 A1 | 2/2011 | Naicker et al. |
| 2011/0040608 A1 | 2/2011 | Cohen et al. |
| 2011/0231258 A1 | 9/2011 | Winters |
| 2011/0276451 A1 | 11/2011 | Busse |
| 2011/0289443 A1 | 11/2011 | Heaven et al. |
| 2011/0313827 A1 | 12/2011 | Lobb et al. |
| 2012/0004967 A1 | 1/2012 | Satyavolu et al. |
| 2012/0004975 A1 | 1/2012 | Satyavolu et al. |
| 2012/0095576 A1 | 4/2012 | Murrell et al. |
| 2012/0166264 A1 | 6/2012 | Shum et al. |
| 2012/0290451 A1 | 11/2012 | Jones et al. |
| 2013/0005437 A1 | 1/2013 | Bethke et al. |
| 2013/0006733 A1 | 1/2013 | Fisher |
| 2013/0014153 A1 | 1/2013 | Bhatia et al. |
| 2013/0030887 A1 | 1/2013 | Calman et al. |
| 2013/0030888 A1 | 1/2013 | Calman et al. |
| 2013/0035987 A1 | 2/2013 | Dreifus et al. |
| 2013/0046607 A1 | 2/2013 | Granville, III |
| 2013/0046634 A1* | 2/2013 | Grigg ..................... G06Q 30/00 705/14.58 |
| 2013/0046702 A1 | 2/2013 | Ross et al. |
| 2013/0059651 A1 | 3/2013 | Palermo et al. |
| 2013/0178257 A1* | 7/2013 | Langseth ................ G06T 17/05 463/4 |
| 2013/0281207 A1* | 10/2013 | Lyons ................ G07F 17/3211 463/33 |
| 2014/0087355 A1 | 3/2014 | Henry et al. |
| 2014/0113674 A1* | 4/2014 | Joseph .................. H04W 4/021 455/519 |
| 2014/0229981 A1 | 8/2014 | Alexander et al. |
| 2014/0274283 A1 | 9/2014 | Helava et al. |
| 2014/0279799 A1 | 9/2014 | Thomas et al. |
| 2014/0358664 A1 | 12/2014 | Wheeler |
| 2015/0007204 A1 | 1/2015 | Feig et al. |
| 2015/0235517 A1 | 8/2015 | Griffin |
| 2016/0071325 A1* | 3/2016 | Callaghan ............. G06T 19/006 345/633 |
| 2016/0180466 A1 | 6/2016 | Caldwell |
| 2017/0140476 A1 | 5/2017 | Lee et al. |

* cited by examiner

SYSTEM AND METHOD FOR LOCATION-BASED TRAFFICKING FOR RESOURCE ACCUMULATION

FIELD OF THE INVENTION

The present invention is generally directed to a system for providing an augmented reality feature of a location-based trafficking or incentivizing process that enables resource accumulation.

BACKGROUND

While methods of managing or encouraging user interaction are currently available, there exists a need for improved location-based trafficking of users through incentivizing interactions with resource accumulation in an augmented reality environment.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for location-based trafficking for resource accumulation. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve providing a resource accumulation application to a user for installation on a mobile device of the user, monitoring location data of the mobile device to determine a location of the mobile device, and determining, based on monitoring the location data, that the mobile device is within a predetermined distance of a resource location. Furthermore, in response to determining that the mobile device is within the predetermined distance of the resource location, the system may automatically transmit a token alert across a wireless network to the mobile device of the user, wherein the token alert activates the resource accumulation application, causing a user interface of the mobile device to display an augmented reality of a camera display that includes a virtual token. Additionally, the system may receive, from the mobile device of the user, a selection of the virtual token, and in response to receiving the selection of the virtual token, apply the virtual token to a resource accumulation account of the user.

Some embodiments of the system further comprise receiving transaction history data of the user and identifying, based on the transaction history data of the user, a known merchant that the user has interacted with in the past, wherein the known merchant is associated with a promotional program of a managing entity. The system may then transmit a notification to the mobile device of the user in response to identifying the known merchant, wherein the notification comprises an indication that the virtual token is available at the resource location, wherein the resource location is a geographical location associated with the known merchant.

Another embodiment of the system comprises receiving an indication of a new transaction between the user and the known merchant and automatically transmitting the token alert across the wireless network to the mobile device of the user in response to receiving the indication of the new transaction, wherein the token alert activates the resource accumulation application, causing the user interface of the mobile device to display the augmented reality of the camera display that includes the virtual token, wherein the virtual token is associated with an additional value based on the new transaction.

In some embodiments, the system further comprises automatically transmitting a resource alert across the wireless network to the mobile device of the user in response to determining that the mobile device of the user is within the predetermined distance of the resource location, wherein the resource alert activates the resource accumulation application, causing a user interface of the mobile device to display a selectable notification of a close proximity to the virtual token. Additionally, this embodiment of the system may further comprise receiving, from the mobile device of the user, an indication of a selection of the selectable notification of the close proximity to the virtual token and automatically transmitting the token alert across the wireless network to the mobile device of the user in response to receiving the indication of the selection.

In some embodiments of the system, the virtual token comprises a coin, an emblem, a ticket, a coupon, or a virtual representation of at least a portion of a goal.

Furthermore, in some embodiments of the system, displaying the augmented reality of the camera display further comprises a display of the virtual token at a predetermined distance and orientation from the mobile device.

Additionally, in some embodiments of the system, displaying the augmented reality of the camera display further comprises causing the mobile device of the user to monitor the camera display for a triggering symbol and causing the mobile device display to include the virtual token in response to identifying the triggering symbol.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
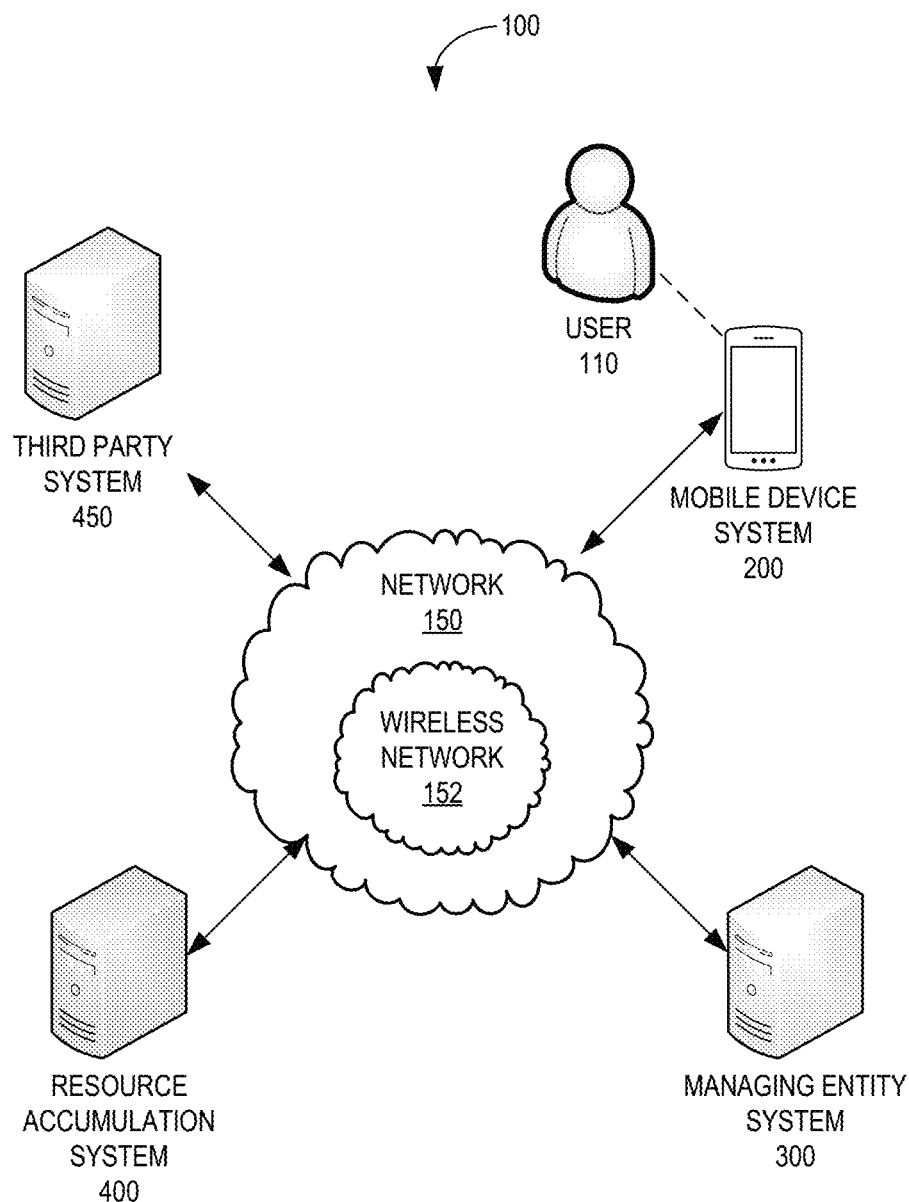
Figure 2:
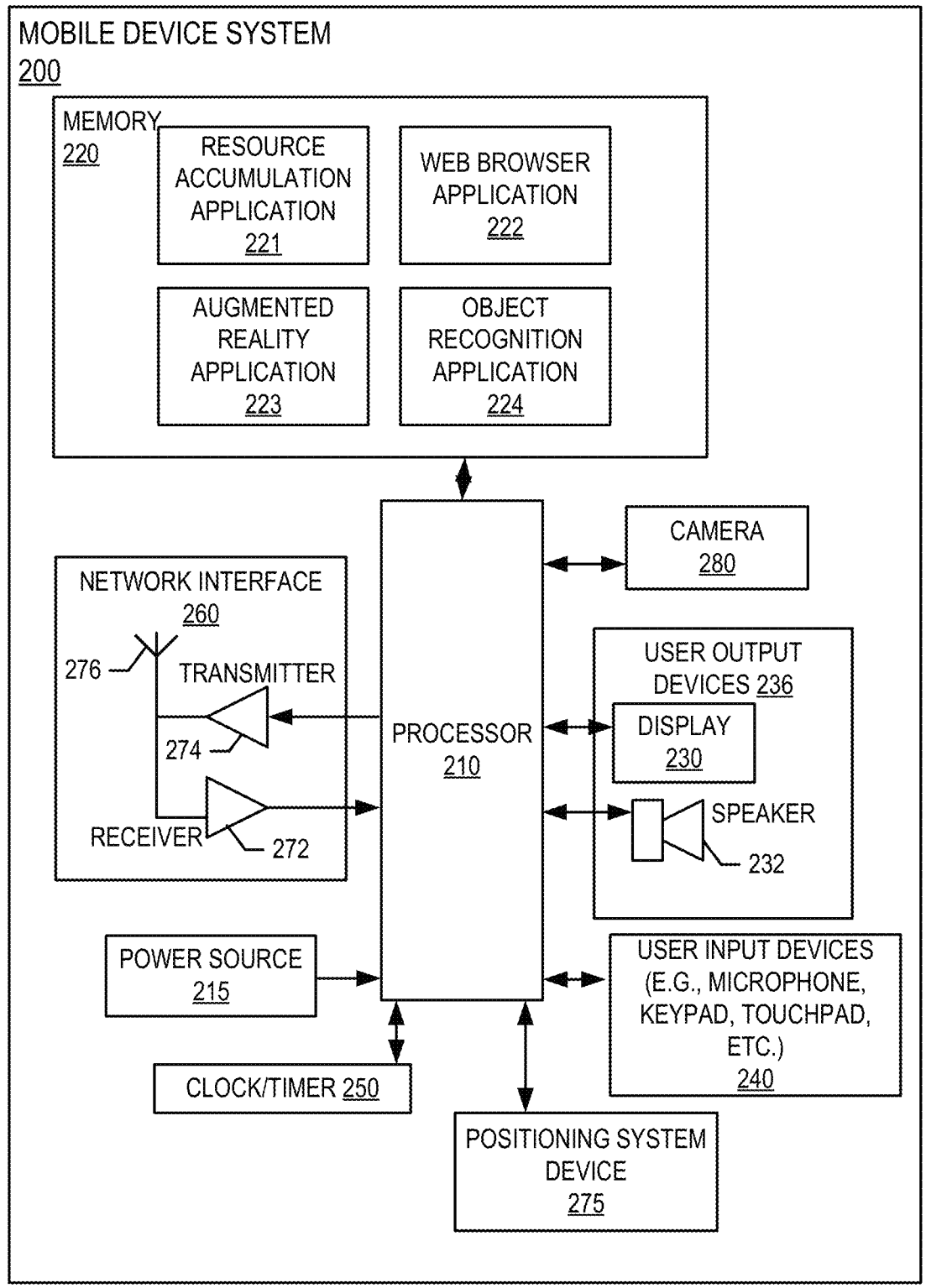
Figure 3:
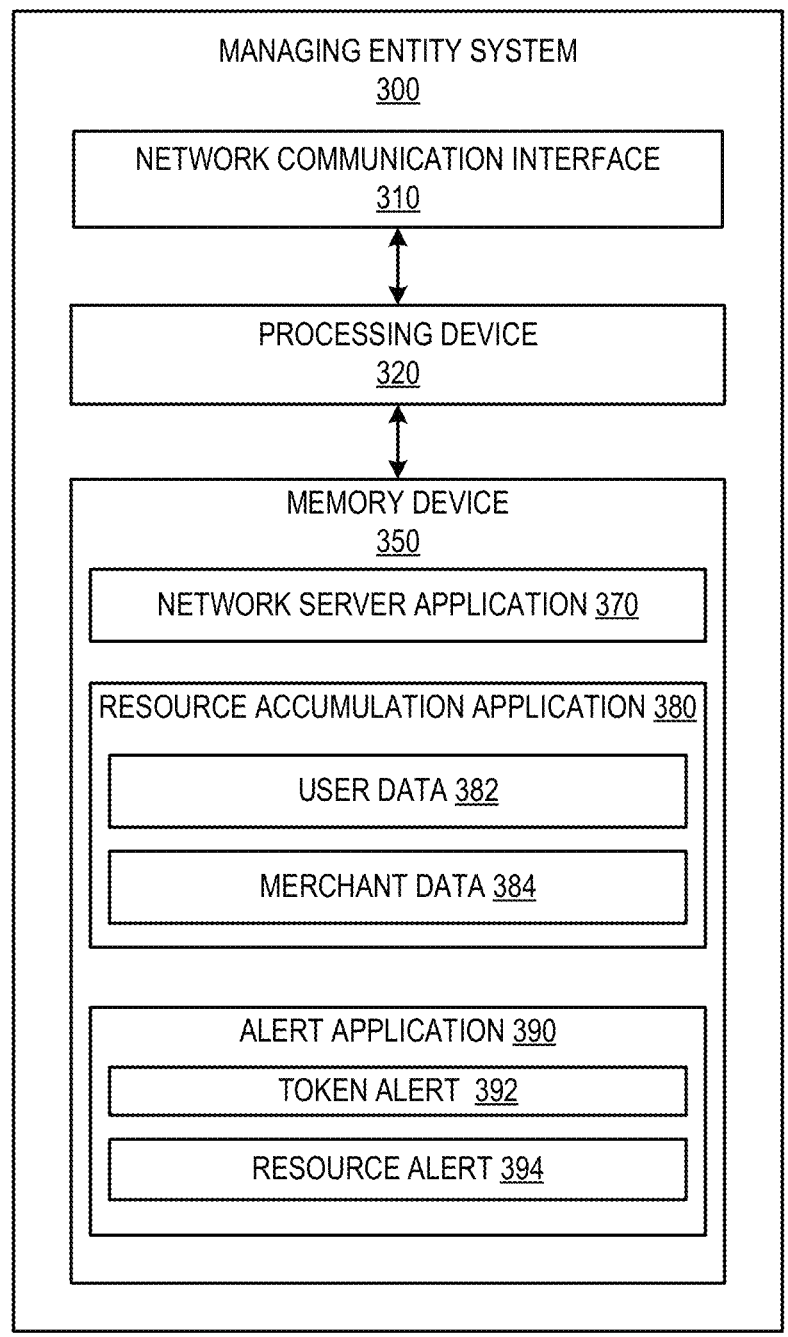
Figure 4:
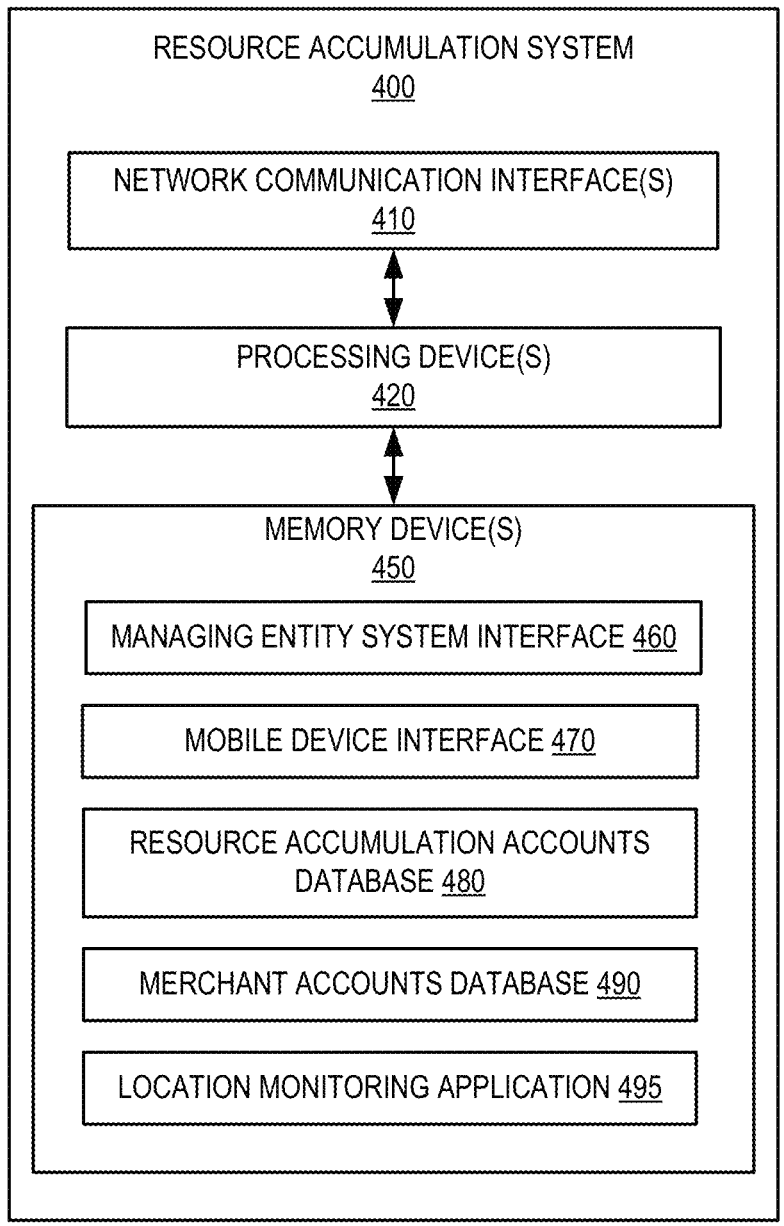
Figure 5:
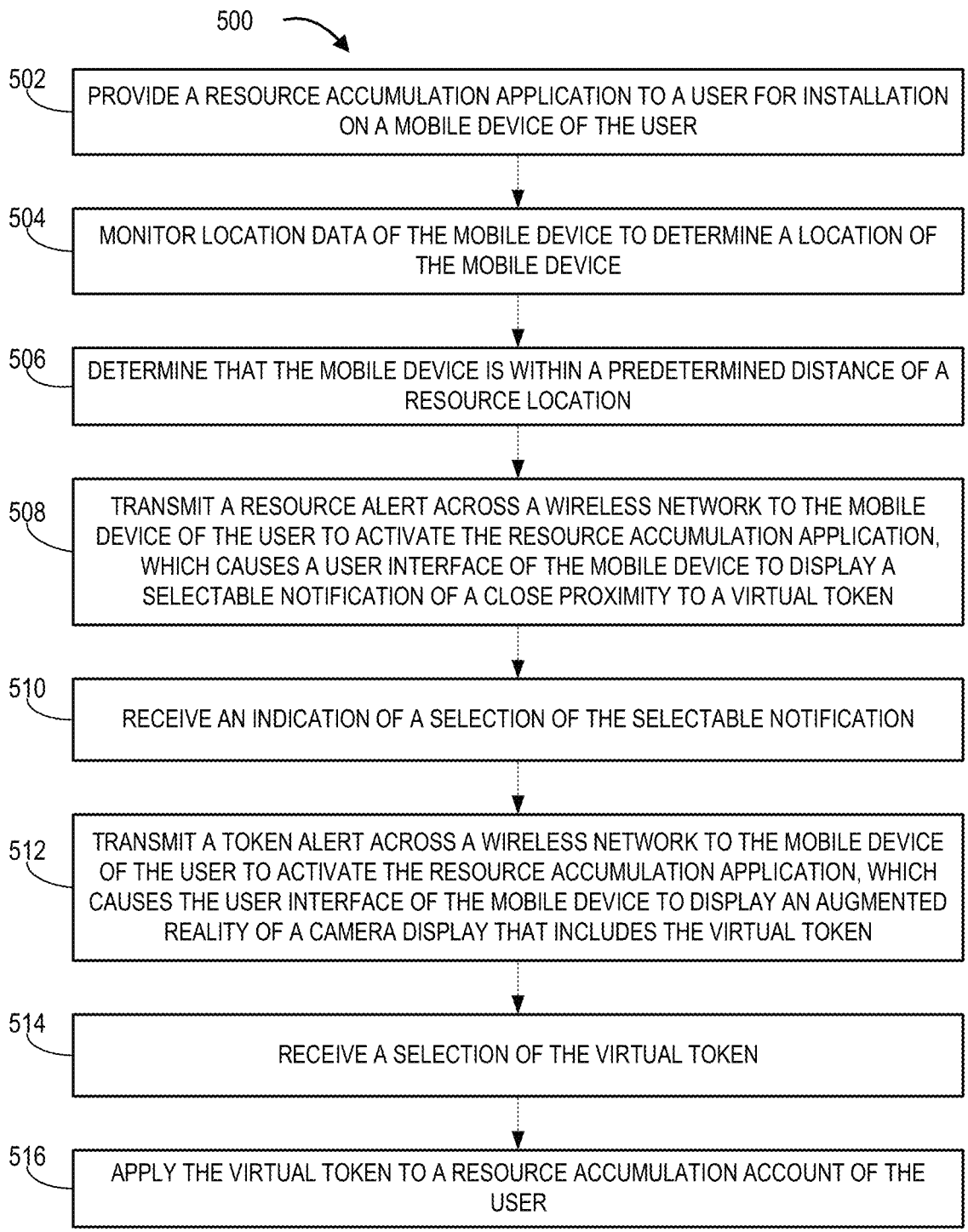
Figure 6:
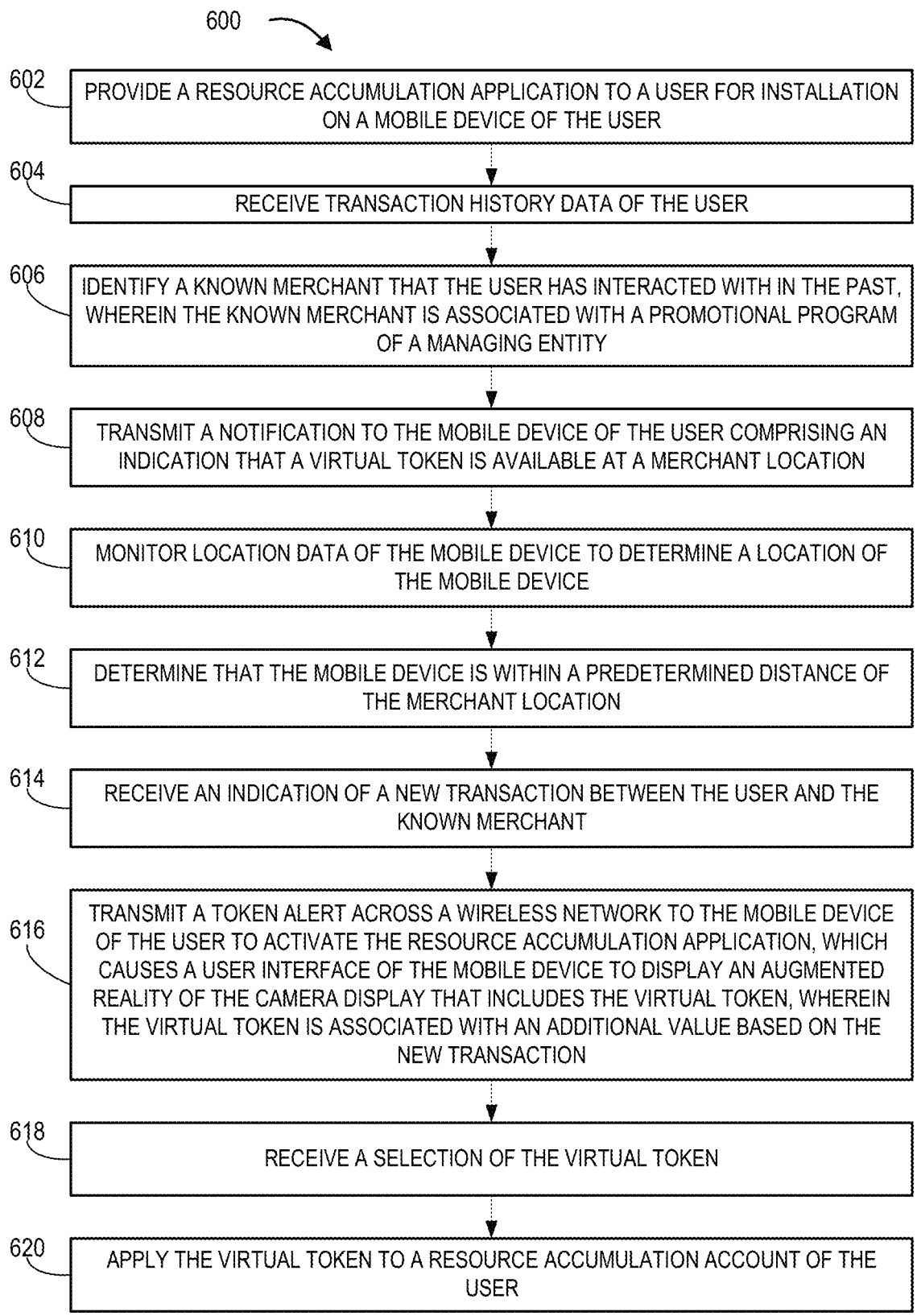

Having thus described embodiments of the invention in general terms, reference will now be made the accompanying drawings, wherein:

FIG. 1 provides a block diagram illustrating a system environment for location-based trafficking for resource accumulation, in accordance with an embodiment of the invention;

FIG. 2 provides a block diagram illustrating a mobile device system of FIG. 1, in accordance with an embodiment of the invention;

FIG. 3 provides a block diagram illustrating the managing entity system of FIG. 1, in accordance with an embodiment of the invention;

FIG. 4 provides a block diagram illustrating the resource accumulation system of FIG. 1, in accordance with an embodiment of the invention;

FIG. 5 provides a flowchart illustrating a process for location-based trafficking for resource accumulation, in accordance with an embodiment of the invention; and FIG. 6 provides a flowchart illustrating a process for location-based trafficking for resource accumulation using a merchant promotional program, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for location-based trafficking for resource accumulation. In particular, techniques are provided for incentivizing users to visit a specific location and/or interact with a merchant at a merchant location by providing some resource that can be used or accumulated to create some benefit for the user. In this way, the system improves the foot traffic and user interaction with merchants at specific geographic locations by encouraging users to stop by the merchant's store and/or purchase one or more products of the merchant.

The incentivizing tool may be a token, coin, coupon, emblem, ticket, rebate, or any other reward (hereinafter referred to as a "token"). The token may be associated with an immediate reward or coupon associated with a merchant and/or a managing entity. Additionally or alternatively, the token may be associated with a mobile or online game or an online class, tutorial, or other application. For example, the user may have increased purchasing power, improved status levels, additional gaming content, and the like in a mobile game.

In some embodiments, the mobile game may be associated with a financial institution, and may improve financial literacy, improve knowledge of available financial products of the financial institution, improve budgeting strategies, fundraising, achieving savings goals, and the like. In this way, the system enables a user to acquire, find, accumulate, utilize, and otherwise collect tokens in a manner that relates to a managing entity, a financial institution, a mobile or online game, a rewards program, a fundraising goal, a savings goal, and the like. In some embodiments, the system allows users to find and select virtual tokens in an online environment, an augmented reality environment, and/or in a virtual reality environment. For example, a user may be able to use an augmented reality application on a mobile device (e.g., a mobile phone) or an augmented reality lens to search a geographic location for selectable virtual tokens that will appear on the mobile device or augmented reality lens display.

While the term "augmented reality" is used throughout the application, it should be known that the same or similar concepts can be achieved in virtual reality and/or mixed reality environments. The invention is not intended to be limited to the augmented reality environment but some applications are especially beneficial to utilize an augmented or mixed reality environment as virtual tokens appear to be present in a real, physical location near the user.

The system can also direct users to specific locations that have virtual tokens (e.g., merchant locations, financial centers, and the like), alert users when virtual tokens are nearby, and provide incentives to interact with merchants to receive additional or more valuable virtual tokens. For example, the system may inform a user that a purchase at a specific merchant location will cause a high-valued virtual token to appear or otherwise be available in a geographical location of that known merchant.

To accomplish the incentivizing process, the system may provide a resource accumulation application to users, where the resource accumulation application can be associated with a financial institution, a mobile game, a mobile application, and/or an educational platform. Once a user has enrolled in the resource accumulation program that provides the application, the system can monitor location data of the mobile device of the user. Once the system determines the user is at or close to a predetermined geographical location (e.g., a merchant location), the system may transmit an alert to the mobile device of the user, activating the resource accumulation application to cause the mobile device to display an augmented reality of a camera display.

This augmented reality display may be based on images or video acquired by a camera of the mobile device, and the system may overlay or otherwise insert a virtual token within the augmented reality environment. In this way, a user may be able to use the augmented reality mobile device to scan the user's surroundings in search of one or more virtual tokens. Once the user identifies the virtual token within the augmented reality display of the mobile device, the user may select the token (e.g., by tapping a touchscreen at the location of the virtual token), or the token is otherwise acquired by the user and added to the user's resource accumulation account.

The system can provide the augmented reality in several different ways. For example, in some embodiments, a virtual token is positioned at a predetermined virtual distance (e.g., a perceived distance on the mobile device camera display) and orientation (e.g., relative to the device, directional, global positioning system location, and the like) from the mobile device. In other embodiments, the system monitors the camera feed of the mobile device for a known or predetermined triggering symbol and causes the mobile device display to present the virtual token once this triggering symbol is identified.

The triggering system may be a predetermined code, image, text, emblem, icon, or the like. As an example, if the user is at an automated teller machine (ATM) and uses the mobile device camera to scan the ATM, the system may search for an icon or sticker on the ATM that is a known or predetermined triggering symbol. Once the system identifies the symbol from the camera feed, the system can cause a virtual token to be present on the display of the mobile device. This triggering symbol can also be useful as a coupon program. For example, a merchant may include a triggering symbol on a box, display, or other packaging of its product, or at a specific location within its store, so that a user can scan the triggering symbol to receive a coupon, reward, or other token.

Of course, this system is able to perform additional or alternative functions, such as to provide notifications to the user that virtual tokens are available at specific locations, to provide notifications that the virtual tokens are nearby (e.g., by illustrating token locations on a map), incorporate the virtual tokens with an online game, and the like. The system may also provide additional virtual tokens or increase the value of one or more virtual tokens when the system determines that the user has interacted with a merchant (e.g., the user has made a purchase with the merchant, the user has purchased a specific product, the user has spent a specific amount of time at or near the geographical location, and the like).

FIG. 1 provides a block diagram illustrating a system and environment 100, in accordance with an embodiment of the invention. As illustrated in FIG. 1, the environment 100 includes a mobile device system 200, a managing entity system 300, a resource accumulation system 400, and a third party system 450. The system environment 100 can also include a user 110 that is associated with the mobile device system 200. The user 110 may be a customer of a managing entity that is in control of the managing entity system 300 and/or the resource accumulation system 400.

As shown in the system environment 100, the mobile device system 200, the managing entity system 300, the resource accumulation system 400, and the third party system are communicably connected via the network 150, which in some instances may comprise a wireless network (WAN), and/or a global area network (GAN). The network 150 may provide for wireline, wireless, or a combination of wireline and wireless communication between devices in the network. In one embodiment, the network 150 includes the Internet.

As used herein, a "mobile device" may be any mobile communication device, such as a cellular telecommunications device (i.e., a cell phone or mobile phone), a personal digital assistant (PDA), a mobile Internet accessing device, a virtual reality device, an augmented reality device, a mixed reality device, or any other mobile device that is capable of presenting an augmented or virtual reality.

In some embodiments of this invention, the "mobile device" is a virtual reality device (e.g., headset), an augmented reality or mixed reality device (e.g., headset, lens system, and the like), and the like.

The mobile device system 200 is configured to connect with the network 150 to interface the user 110 with an application of the managing entity system 300, the resource accumulation system 400, and/or one or more third party systems 450. The mobile device system 200 and its capability to interact with the user and other systems in the system environment 100 will be discussed in greater detail with regard to the description of FIG. 2.

The managing entity system 300 is in network communication through the network 150 with other devices, such as mobile device system 200, the resource accumulation system 400, and one or more third party systems 450. The managing entity system 300 may be configured to transmit or otherwise provide computing device applications to one or more of the other systems in the system environment 100, monitor location data of the mobile device system 200, transmit alerts to the mobile device system 200, manage at least a portion of the resource accumulation system 400, receive and search through data associated with the user 110, the resource accumulation system 400, and/or the third party system 450, and the like.

The managing entity system 300 may be configured to transmit commands and/or control signals to one or more systems within the system environment 100. For example, the managing entity system 300 may be configured to transmit one or more alerts over the network 150 to the mobile device system 200, wherein the alert activates one or more applications stored in the mobile device system 200 to cause the mobile device system 200 to perform certain tasks. These tasks may include causing a user interface of the mobile device system 200 to display one or more notifications or requests, causing the display to present an augmented or virtual reality of a camera display, causing the mobile device system 200 to be configured to receive certain input from the user 110, and the like. Of course, other tasks can be accomplished based on the configuration of the mobile device system 200, the applications stored within the mobile device system 200, and the types and functionality of the alerts transmitted by the managing entity system 300.

The resource accumulation system 400 can be any system that manages at least a portion of a resource accumulation program, and is communicably connected to the mobile device system 200, the managing entity system 300, and/or one or more third party systems 450 via the network 150. The resource accumulation system 400 may comprise one or more databases of associated users, associated merchants, resource accumulation program policy details, resource accumulation accounts, and the like. In some embodiments, the resource accumulation system 400 is owned or otherwise controlled by the managing entity, but in other embodiments, one or more third parties own or control the resource accumulation system. At least a portion of the resource accumulation system 400 can be a component of the managing entity system 300 in some embodiments.

The third party system 450 can be comprised of one or more third parties including, but not limited to, merchants, vendors, data providers, wireless connection providers, financial institutions, augmented or virtual reality institutions, education centers, and the like. The third party system 450 may have the same capabilities as the mobile device system 200, the managing entity system 300, and/or the resource accumulation system 400, depending on the requirements and functionality of the particular third party.

FIG. 2 provides a block diagram illustrating a mobile device system 200 of FIG. 1 in more detail, in accordance with embodiments of the invention. In one embodiment of the invention, the mobile device system 200 is a mobile telephone. However, it should be understood that a mobile telephone is merely illustrative of one type of mobile device system 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, mobile televisions, gaming devices, laptop computers, cameras, video recorders, audio/video player, radio, GPS devices, or any combination of the aforementioned.

Some embodiments of the mobile device system 200 include a processor 210 communicably coupled to such devices as a memory 220, user output devices 236, user input devices 240, a network interface 260, a power source 215, a clock or other timer 250, a camera 280, and a positioning system device 275. The processor 210, and other processors described herein, generally include circuitry for implementing communication and/or logic functions of the mobile device system 200. For example, the processor 210 may include a digital signal processor device, a microprocessor device, and various analog to digital converters, digital to analog converters, and/or other support circuits. Control and signal processing functions of the mobile device system 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device system 200 to transmit and receive web content, such as, for example, location-based content and/or other web page content, according to a Wireless Application Protocol (WAP), Hypertext Transfer Protocol (HTTP), and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless network 152. In this regard, the mobile device system 200 may be configured to operate with one or more air interface standards, communication protocols, modulation types, and access types. By way of illustration, the mobile device system 200 may be configured to operate in accordance with any of a number of first, second, third, and/or fourth-generation communication protocols and/or the like. For example, the mobile device system 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device system 200 may also be configured to operate in accordance with non-cellular communication mechanisms, such as via a wireless local area network (WLAN) or other communication/data networks.

As described above, the mobile device system 200 has a user interface that is, like other user interfaces described herein, made up of user output devices 236 and/or user input devices 240. The user output devices 236 include a display 230 (e.g., a liquid crystal display or the like) and a speaker 232 or other audio device, which are operatively coupled to the processor 210.

The user input devices 240, which allow the mobile device system 200 to receive data from a user such as the user 110, may include any of a number of devices allowing the mobile device system 200 to receive data from the user 110, such as a keypad, keyboard, touchscreen, touchpad, microphone, mouse, joystick, other pointer device, button, soft key, and/or other input device(s). The user interface may also include a camera 280, such as a digital camera.

The mobile device system 200 may also include a positioning system device 275 that is configured to be used by a positioning system to determine a location of the mobile device system 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate or exact geographical location of the mobile device system 200. In other embodiments, the positioning system device 275 includes a proximity sensor or transmitter, such as an RFID tag, that can sense or be sensed by devices known to be located proximate a merchant or other location to determine that the mobile device system 200 is located proximate these known devices. The positioning system device 275 may play a crucial role in transmitting location information associated with the mobile device system 200 for determining when the mobile device system 200 is in at or is in close proximity to a resource location.

The mobile device system 200 further includes a power source 215, such as a battery, for powering various circuits and other devices that are used to operate the mobile device system 200. Embodiments of the mobile device system 200 may also include a clock or other timer 250 configured to determine and, in some cases, communicate actual or relative time to the processor 210 or one or more other devices.

The mobile device system 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile device system 200 and/or one or more of the process/method steps described herein. For example, the memory 220 may include such applications as a conventional web browser application 222 and/or a resource accumulation application 221 (or any other application provided by the managing entity system 300). These applications also typically instructions to a graphical user interface (GUI) on the display 230 that allows the user 110 to interact with the mobile device system 200, the managing entity system 300, and/or other devices or systems. In one embodiment of the invention, when the user 110 decides to enroll in a resource accumulation application 221 program, the user 110 downloads, is assigned, or otherwise obtains the resource accumulation application 221 from the managing entity system 300, or from a distinct application server (e.g., from the resource accumulation system 400). In other embodiments of the invention, the user 110 interacts with the managing entity system 300 or the resource accumulation system 400 via the web browser application 222 in addition to, or instead of, the resource accumulation application 221.

The memory 220 of the mobile device system may comprise an augmented reality (or virtual reality) application 223 configured to augment the presentation of images or video from the camera 280 through the display 230 to include additional features like a virtual token. The augmented reality application 223 may work in alongside the resource accumulation application 221 to display a virtual token at a desired location, position, or in response to a particular triggering signal, as provided by the resource accumulation system 400 and/or the managing entity system 300. Furthermore, the memory 220 may comprise an object recognition application 224 that is configured to identify one or more objects, text, signals, or other features of the images and/or video taken by the camera in real time or in near-real time. In this way, the object recognition application 224 may be utilized to identify triggering symbols of the resource accumulation application as part of the augmented reality experience for the user 110. Finally, one or more additional applications (not shown) may be stored in the memory 220 of the mobile device system 200.

The memory 220 can also store any of a number of pieces of information, and data, used by the mobile device system 200 and the applications and devices that make up the mobile device system 200 or are in communication with the mobile device system 200 to implement the functions of the mobile device system 200 and/or the other systems described herein. For example, the memory 220 may include such data as user resource accumulation information, and the like.

As discussed above, in some embodiments of the invention, an application server or application download server (not shown) might be provided. The application download server may include a network communication interface, a processing device, and a memory device. The network communication interface and processing device are similar to the previously described network communication interface 210 and the processing device 220 previously described with respect to the managing entity system 200. For example, the processing device is operatively coupled to the network communication interface and the memory device. In one embodiment of the application download server, the memory device includes a network browsing application having computer-executable program code that instructs the processing device to operate the network communication interface to perform certain communication functions of the application download server described herein. In some embodiments of the invention, the application download server provides applications that are to be downloaded to a user mobile device system 200, to a component of the managing entity system 300, to a component of the resource accumulation system 400, and/or to one or more third party systems 450.

FIG. 3 provides a block diagram illustrating the managing entity system 300, in greater detail, in accordance with embodiments of the invention. As illustrated in FIG. 3, in one embodiment of the invention, the managing entity system 300 includes one or more processing devices 320 operatively coupled to a network communication interface 310 and a memory device 350. In certain embodiments, the managing entity system 300 is operated by a first entity, such as a financial institution, while in other embodiments, the managing entity system 300 is operated by an entity other than a financial institution.

It should be understood that the memory device 350 may include one or more databases or other data structures/repositories. The memory device 350 also includes computer-executable program code that instructs the processing device 320 to operate the network communication interface 310 to perform certain communication functions of the managing entity system 300 described herein.

For example, in one embodiment of the managing entity system 300, the memory device 350 includes, but is not limited to, a network server application 370, a resource accumulation application 380 comprising user data 382 and merchant data 384, an alert application 390 comprising at least one token alert 392 and at least one resource alert 394, and other computer-executable instructions or other data. The computer-executable program code of the network server application 370, the resource accumulation application 380, or the alert application 390 may instruct the processing device 320 to perform certain logic, data-processing, and data-storing functions of the managing entity system 300 described herein, as well as communication functions of the managing entity system 300.

In one embodiment, the resource accumulation application 380 includes user data 382 and merchant data 384. The user data 382 may comprise stored data associated with one or more users (e.g., the user 110), including but not limited to transaction data, user preferences, user financial account data, user resource accumulation account data, and the like. The merchant data 384 may comprise stored data associated with one or more merchants, including but not limited to geographical location data, transaction data, offers or rewards data, and the like. Both the user data 382 and the merchant data 384 may also comprise a data repository that can be searched to compare data or information or to identify the presence of certain user or merchant data. As such, the network server application 370 and the resource accumulation application 380 are configured to invoke or use the user data 382 and/or the merchant data 384 when carrying out one or more of the processes described herein.

Similarly, the alert application 390 may include the token alert 392 and the resource alert 394. The token alert 392 may comprise one or more stored functions, program readable instructions, or other commands that can be transmitted to the mobile device system 200, the resource accumulation system 400, or one or more a third party systems 450. Likewise, the resource alert 394 may comprise one or more stored functions, program readable instructions, or other commands that can be transmitted to a the mobile device system 200, the resource accumulation system 300, or one or more a third party systems 450. As such, the network server application 370 and the alert application 390 are configured to invoke or use the token alert 392 and/or the resource alert 394 when carrying out one or more of the processes described herein.

The token alert 392 and the resource alert 394, once transmitted to another device or system, may be configured to activate one or more applications stored on that device or system, like the resource accumulation application 221 of the mobile device system 200, and thereby cause the one or more applications to perform functions associated with their associated systems. For example, the token alert 392 may be transmitted across the wireless network 150 to the mobile device system 200 of the user 110 to activate the resource accumulation application 221 of the mobile device system 200, causing the user interface of the mobile device system 200 to display an augmented reality of a camera display that includes a virtual token. Additionally or alternatively, the resource alert 394 may be transmitted across the wireless network 150 to the mobile device system 200 of the user 110 to activate the resource accumulation application 221 of the mobile device system 200, which in turn causes the user interface of the mobile device system 200 to display a selectable notification of a close proximity to a virtual token.

As used herein, a "communication interface" generally includes a modem, server, transceiver, and/or other device for communicating with other devices on a network, and/or a user interface for communicating with one or more customers. Referring again to FIG. 3, the network communication interface 310 is a communication interface having one or more communication devices configured to communicate with one or more other devices on the network 150, such as the mobile device system 200, the resource accumulation system 400, and/or the one or more third party systems 450. The processing device 320 is configured to use the network communication interface 310 to transmit and/or receive data and/or commands to and/or from the other devices connected to the network 150.

FIG. 4 provides a block diagram illustrating a resource accumulation system 400, in accordance with embodiments of the invention. As illustrated in FIG. 4, the resource accumulation system 400 generally includes, but is not limited to, a network communication interface 410, one or more processing devices 420, and one or more memory devices 450. The processing device 420 is operatively coupled to the network communication interface 410 and the memory device 450. In one embodiment of the resource accumulation system 400, the memory device 450 stores, but is not limited to, a managing entity system interface 460, a mobile device interface 470, a resource accumulation accounts database 480, a merchant accounts database 490, and/or a location monitoring application 495.

The managing entity system interface 460 and the mobile device interface 470 may associate with applications having computer-executable program code that instructs the processing device 420 to operate the network communication interface 410 to perform certain communication functions involving the resource accumulation accounts database 480, the merchant accounts database 490, and the location monitoring application 495 described herein.

In some embodiments, the resource accumulation accounts database 480 stores data including, but not limited to, user account information, user progress, user rewards or coupons, a total quantity of acquired tokens for a user, token goals, computer product instructions received from the managing entity system 300, and the like. Additionally, the merchant accounts database 490 stores data including, but not limited to, geographical locations of merchants, lists of merchants that are associated with a resource accumulation program, rewards or benefits offered by merchants, rewards or benefits offered by the managing entity for user interaction with a merchant, and the like.

The location monitoring application 495 may be any application capable of being configured to monitor one or more mobile devices (e.g., the mobile device system 200), using any form of positioning data. For example, the location monitoring application 495 may continuously retrieve GPS data associated with the mobile device system 200 to determine a location of the mobile device system 200 at any given point in time. Additionally or alternatively, the location monitoring application 495 may be configured to actively transmit one or more signals that are configured to detect the presence of the mobile device system 200.

The network communication interface 410 is a communication interface having one or more communication devices configured to communicate with one or more other devices on the network 150. The processing device 420 is configured to use the network communication interface 410 to receive information from and/or provide information and commands to a mobile device system 200, a managing entity system 300, and/or the one or more third party systems 450 via the network 150.

In some embodiments, the processing device 420 also uses the network communication interface 410 to access other devices on the network 150, such as one or more web servers of one or more third-party data providers. In some embodiments, one or more of the devices described herein may be operated by a second entity so that the second entity controls the various functions involving the resource accumulation system 400. For example, in one embodiment of the invention, although the managing entity system 300 is operated by a first entity (e.g., a financial institution), a second entity operates the resource accumulation system 400 that stores received data in the resource accumulation accounts database 480 and/or the merchant accounts database 490.

In some embodiments, at least a portion of the resource accumulation system 400 comprises a physical device such as a computing device, a chip, a smart wearable device, an Internet of things device, or the like.

Referring now to FIG. 5, a flowchart is provided to illustrate one embodiment of a process 500 for location-based trafficking for resource accumulation, in accordance with embodiments of the invention. In some embodiments, the process 500 may include block 502, where the system provides a resource accumulation application to a user for installation on a mobile device of the user. The resource accumulation application may comprise stored computer program code that is configured to, when activated by a control signal or other alert, cause the mobile device system 200 to perform certain actions or functions. For example, a token alert may activate the resource accumulation application to cause a user interface of the mobile device system 200 to display an augmented reality of a camera display that includes a virtual token. Additionally or alternatively, a resource alert may activate the resource accumulation application to cause the mobile device system 200 to display a selectable notification of a close proximity to the virtual token. In some embodiments, activation of the resource accumulation application causes the mobile device system to request and/or receive user input (e.g., user selections) and to automatically report such user input back to a managing entity system 300.

In some embodiments, the process 500 includes step 504, where the system monitors location data of the mobile device to determine a location of the mobile device. As described above with respect to the mobile device system 200, the system may track (e.g., periodically or continuously) global positioning system (GPS) data of the mobile device system 200. In some such environments, geographical location coordinates may be received and monitored by the system.

In other embodiments, the system may provide physical location determination devices (e.g., near field communication (NFC) chips, radio-frequency identification (RFID) chips, and the like) at known locations that can detect the presence of known mobile device systems 200 and thereby report back to the system the known location of the mobile device. Additionally or alternatively, the system may receive user 110 input, via the mobile device system 200 of current location, an image of a triggering symbol, or the like. In such embodiments, the exact physical location of the mobile device may not be important, as the user input informs the system that the user is in a location that can associated with resource accumulation (e.g., a location that can contain a selectable virtual token).

Additionally, in some embodiments, the process 500 includes block 506, where the system determines that the mobile device is within a predetermined distance of a resource location. As used herein, the term "resource location" refers to a geographical location, a merchant location, an ATM location, a banking center location, or any other location that can be associated with a resource accumulation program and thereby may be a location of a selectable virtual token.

In some embodiments, the managing entity system 300 and/or the resource accumulation system 400 may store one or more predetermined resource locations in a searchable resource location database. The system may then compare the received location data of the mobile device to determine whether the received location data matches or is substantially similar to the stored resource location database data. Once a match is identified, the system has determined that the mobile device is within the predetermined distance of the resource location.

The process 500 may also include block 508, where the system transmits a resource alert across a wireless network to the mobile device of the user to activate the resource accumulation application, which causes a user interface of the mobile device to display a selectable notification of a close proximity to a virtual token. In some embodiments, the transmittal of the resource alert may be performed automatically by the system in direct response to determining that the mobile device of the user is within the predetermined distance of the resource location. The resource alert may include computer readable code configured to instruct the resource accumulation application stored on the mobile device to be activated (e.g., turn on and/or transform into an active state), where such activation of the resource accumulation application causes the mobile device to perform one or more specific functions (e.g., change the display, present a notification message, be configured to receive user input, and the like).

The resource alert may be associated with causing the mobile device of the user to display a message, provide an SMS text message, vibrate, display an indication light (e.g., an LED), emit an audible alarm, and the like, to convey to the user that the user is at or near a resource location. In some embodiments, the activation of the resource accumulation application by the resource alert causes the mobile device of the user to display a map of a surrounding geographical area of the user with one or more indications of resource locations on the map. For example, if a user is walking down a street and is within a predetermined number of yards from a known merchant's store, then the system may automatically transmit the resource alert to inform the user that if the user travels to that known merchant's store and/or engages with the merchant in some way, then the user can acquire or otherwise accumulate resources in the form of virtual tokens. In this way, the system can traffic users towards resource locations like a participating merchant's store by incentivizing the user's presence and/or interactions with tokens, credits, coupons, rewards, and the like.

In some embodiments, the process 500 includes block 510, where the system receives an indication of a selection of the selectable notification of the close proximity to the virtual token and/or the resource location. The system may require the selection of the notification before proceeding to block 512 or, in other embodiments, no selection of the notification is required.

Additionally, in some embodiments, the process 500 includes block 512, where the system transmits a token alert across a wireless network to the mobile device of the user to activate the resource accumulation application, which causes the user interface of the mobile device to display an augmented reality of a camera display that includes the virtual token. In some embodiments, block 512 is performed automatically in response to the determination step in either block 508 or block 510.

As used herein, the term "virtual token" refers to a virtual representation of a token within an augmented reality, virtual reality, and/or mixed reality environment. The virtual token may represent a physical token, an achievement in a virtual game or online course, a level of progression towards a goal in a virtual game or online course, a reward, an offer (e.g., a coupon for a specific merchant, an improved level of service, and the like), or any other token concept. Within a virtual environment (e.g., an augmented reality or a virtual reality), the virtual token may be represented or illustrated as a coin, a credit, an emblem, an icon, a symbol, a ticket, a coupon, a monetary note, an emoji, a picture, a video, a representation of at least a portion of a goal (e.g., an amount of "mercury" that can be added to a savings or fundraising thermometer chart), and the like. These lists are meant for illustrative purposes only, as the token may represent any item or idea and the virtual representation of the token may be any representation of an object that can be identified as the token.

The virtual token can be acquired and/or accumulated by the user, used immediately, stored and used at a later point in time, and the like. In some embodiments, the virtual token provides additional credit to a mobile game or application that the user is associated with, such that the user has improved functionality, grows closer to reaching a gaming goal, and the like. In some embodiment, the virtual token provides a coupon, rebate, or other reward that may be used by the user with one or more merchants or the managing entity. In some embodiments, the virtual token can represent a portion of a goal that, when achieved, provides a coupon, rebate, other reward, credit, improved service level, additional downloadable content, and the like. For example, if the user accumulates a predetermined number of virtual tokens, then the system may transmit a coupon to the user for a reduced purchase price of some product (e.g., a merchant's product, a product of the managing entity, and the like.)

In some embodiments, the virtual token can be a virtual representation of actual savings. For example, if the system informs a user of savings at a specific merchant and the merchant completes a transaction with that merchant, then the amount of savings can be presented as a virtual token (e.g., as a virtual representation of money, as a virtual check with the savings amount shown, as a numerical representation of the amount saved, and the like, a virtual representation of an amount of time saved by performing one or more transactions with the merchant, and the like). In such embodiments, the virtual token may be found within the merchant's location (i.e., the resource location).

In some embodiments, displaying the augmented reality of the camera display further comprises a display of the virtual token at a predetermined distance and orientation from the mobile device. For example, once the system causes the mobile device to present the augmented virtual reality environment on the display, the system may automatically generate a location for the virtual token as being the exact direction the mobile device camera is facing, an angle up, down, left, and/or right from the initial direction of the mobile device camera, and the like.

In other embodiments, the system already has a predetermined location for the virtual token at the virtual location and automatically inputs the coordinates into the augmented reality application such that the virtual token is only shown on the mobile device display when the mobile device camera is pointing towards the predetermined coordinates.

The virtual token may be presented in any form, may be translucent or opaque, may be any size, may be stationary with respect to one or more objects in the camera display, may move with respect to one or more objects in the camera display, and/or the like.

In some embodiments, displaying the augmented reality of the camera display comprises causing the mobile device of the user to monitor the camera display for a triggering symbol and, in response to identifying the triggering symbol, causing the mobile device display to include the virtual token in the presented augmented reality. As used herein, the term "triggering symbol" refers to any object, code, sequence, image, icon, text, signal, or other symbol that can be identified by the system and/or the resource accumulation application of the mobile device. As such, when the camera display of the mobile device shows the triggering symbol, the system and/or the resource accumulation application of the mobile device is identifies the triggering symbol within the augmented reality environment.

For example, the triggering symbol may be a sticker of resource accumulation icon. This sticker may be placed in a visible position at the resource location. Therefore, when the user moves the mobile device around in search of a virtual token, the camera feed will acquire the image and/or video of the icon sticker, the system will identify the icon sticker as a triggering symbol, and will present the virtual token in the augmented reality environment in response to the identification. In some embodiments, the virtual token will be overlaid on top of the triggering symbol. For example, the triggering symbol may have several anchor points that are identifiable by the system such that the virtual token is displayed in the augmented reality environment with a specific orientation and placement relative to the anchor points. In other embodiments, the virtual token will be presented in a direction and/or location different from the triggering symbol.

Furthermore, the process 500 may include block 514, where the system receives an indication of a selection of the virtual token. In some embodiments, this indication is received from the mobile device of the user. For example, the mobile device of the user may receive user input (e.g., from a touchscreen, from a verbal command acquired by a microphone of the mobile device, from visual signal acquired by a camera of the mobile device (e.g., a facial cue), and the like). The mobile device system may then automatically transmit an indication of the user's selection back to the managing entity system and/or the resource accumulation system.

In some embodiments, the user is not required to select the virtual token, but rather the virtual token is automatically acquired by the user when the virtual token is visualized in the augmented reality environment. For example, once a virtual token is found on the display of the mobile device, the mobile device may automatically transmit an indication of the acquisition of the virtual token to the system instead of requiring a selection of the virtual token.

Finally, the process 500 may continue to block 516, where the system applies the virtual token to a resource accumulation account of the user. In some embodiments, block 516 is carried out in direct response to receiving the selection of the virtual token from the mobile device of the user. As mentioned above, the system may store the acquired virtual token in a resource accumulation database associated with the user. This resource accumulation database may be associated with a mobile game, a mobile application, an online educational course, a rewards program, a fundraising goal, a savings goal, and the like. Additionally, further action can be taken by the system associated with the received virtual token.

For example, the system may transmit a rebate (or instruct a merchant or other third party to provide a rebate) to a financial account of the user in direct response to receiving a virtual token that represents a predetermined rebate. Similarly, the system may monitor the number of accumulated tokens and/or a value of the accumulated tokens and perform some step in direct response to meeting a threshold number or value. For example, if a user is interacting with a mobile game that provides additional functionality or improved capabilities to the user if the user acquires a threshold number of virtual tokens, the system may monitor the number of acquired virtual tokens and transmit an indication to the mobile game once the threshold number of tokens is met.

Referring now to FIG. 6, a flowchart is provided to illustrate one embodiment of a process 600 for location-based trafficking for resource accumulation using a merchant promotional program, in accordance with embodiments of the invention. In some embodiments, the process 600 may include block 602, where the system provides a resource accumulation application to a user for installation on a mobile device of the user. The process steps associated with block 602 may be the same or substantially similar to those process steps associated with block 502. Additionally, the system may provide or request the involvement of a merchant with the merchant promotional program. Merchants associated with this promotional program may be able to input (or request the input of) resource locations into a resource location database of the system to help traffic users to visit or otherwise engage with the merchants. The system may also request and/or receive interaction requests from the merchants that include specific deals, coupons, rewards programs, and the like that can be associated with trafficking users to visit and/or interact with the merchants. All of this merchant data may be stored in a database of the system or of a third party system (e.g., the resource accumulation system 400).

In some embodiments, the process 600 includes step 604, where the system receives transaction history data of the user. In some embodiments, the system is operated by a managing entity that is a financial institution. If the user is a customer of the financial institution, then the financial history can, with the user's permission, access a transaction history of the user to identify merchants that the user has engaged with in the past. Additionally or alternatively, the system can identify types of merchants, common locations of purchases by the user, and other features available in the user's transaction data to help identify common merchants, merchant types, geographic locations of transactions, transaction types, and the like.

Additionally, in some embodiments, the process 600 includes block 606, where the system identifies a known merchant that the user has interacted with in the past, wherein the known merchant is associated with a promotional program of a managing entity. This identification can be based on a search of the user's historical transaction data and a comparison to a known merchant database, where the known merchant database comprises merchants that have enrolled in the promotional program offered by the managing entity. In other embodiments, the system may match a common merchant type associated with historical transactions of the user and identify a known merchant of the same merchant type in the merchant database, even if the user has never engaged with this merchant in the past. In this way, the system may help drive new customers to the known merchant. Therefore, while block 606 refers to the identification of a known merchant from the historical transaction data, it should be known that the identified known merchant can be a new merchant for the user, where the new merchant is based on a common merchant type of the user, a common geographical location for transactions of the user, and the like.

The process 600 may also include block 608, where the system transmits a notification to the mobile device of the user comprising an indication that a virtual token is available at a merchant location. This notification can be in the form of an SMS message, a pop-up notification on the display of the mobile device of the user (e.g., via the resource accumulation application), and the like. The notification informs the user that if the user visits and/or interacts with the merchant in a particular way, then one or more virtual tokens will be made available to the user.

In some embodiments, the system analyzes the merchant database to identify one or more coupons, rewards, rebates, or other promotional items of the known merchant. Once a promotional item has been identified by the system, the system can push a notification out to the user that includes the particular promotional item and any prerequisites for being able to acquire the representation of the promotional item in the form of a virtual token. For example, a merchant may require that a user spends a predetermined amount of money or time at the merchant's location. In such embodiments, the system will transmit a notification to the mobile device of the user, instructing the user to be present at the merchant's location for the predetermined period of time and/or to spend the predetermined amount of money with the merchant to cause one or more virtual tokens to appear at the merchant's location.

In some embodiments, the process 600 includes block 610, where the system monitors location data of the mobile device to determine a location of the mobile device. As described with respect to block 504, the system may track (e.g., periodically or continuously) global positioning system (GPS) data of the mobile device system 200. In some such environments, geographical location coordinates may be received and monitored by the system.

In other embodiments, the system may provide physical location determination devices (e.g., near field communication (NFC) chips, radio-frequency identification (RFID) chips, and the like) at known locations that can detect the presence of known mobile device systems 200 and thereby report back to the system the known location of the mobile device. Additionally or alternatively, the system may receive user 110 input, via the mobile device system 200 of current location, an image of a triggering symbol, or the like. In such embodiments, the exact physical location of the mobile device may not be important, as the user input informs the system that the user is in a location that can associated with resource accumulation (e.g., a location that can contain a selectable virtual token).

Additionally, in some embodiments, the process 600 includes block 612, where the system determines that the mobile device is within a predetermined distance of the merchant location. As described with respect to block 506, the managing entity system 300 and/or the resource accumulation system 400 may store one or more predetermined resource locations in a searchable resource location database. The system may then compare the received location data of the mobile device to determine whether the received location data matches or is substantially similar to the stored resource location database data. Once a match is identified, the system has determined that the mobile device is within the predetermined distance of the resource location.

The process 600 may include block 614, where the system receives an indication of a new transaction between the user and the known merchant. Again, if the managing entity is a financial institution of which the user is a client, then the system may monitor (periodically or continuously) the transaction data of the user for new transactions that are associated with the known merchant. This step is important for promotional programs that require a number of transactions and/or a transactional amount with the known merchant before a virtual token is made available to the user and/or a virtual token of an improved value or benefit is made available to the user.

Furthermore, the process 600 may include block 616, where the system transmits a token alert across a wireless network to the mobile device of the user to activate the resource accumulation application, which causes a user interface of the mobile device to display an augmented reality of a camera display that includes the virtual token, wherein the virtual token is associated with an additional value based on the new transaction. In some embodiments, the process steps associated with block 616 are automatically carried out in direct response to determining that the user has conducted a transaction with the known merchant. In embodiments where a threshold number of transactions or a threshold transaction amount are required for the promotional offer of the known merchant, then the process steps associated with block 616 are automatically carried out in direct response to a determination that such a threshold has been met.

In some embodiments, the known merchant may have an additional (e.g., a second) promotional level with its own transaction amount threshold, wherein additional virtual tokens will be made available to the user if the user meets the additional level's transaction amount threshold. If this additional promotional level transaction amount threshold is subsequently met by the user, then the system may repeat the process steps in block 616 to make the additional virtual tokens available to the user in the augmented reality environment. Therefore, in some embodiments, the system may transmit an additional notification or alert to the mobile device of the user, informing the user of the additional promotional level and the required prerequisites. In this manner, the system helps incentivize a user to further engage with a merchant beyond the initial transaction and virtual token acquisition.

Additionally, the process 600 may include block 618, where the system receives a selection of the virtual token and, as shown in block 620, applies the virtual token to a resource accumulation account of the user. The process steps associated with blocks 618 and 620 may be the same or substantially similar to those of blocks 514 and 516, respectively.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 7628US1.014033.2952 | 15/430,017 published as 2018/0232762 | TARGETED RESOURCE TOKEN GENERATION AND DEPLOYMENT | Concurrently herewith |
| 7629US1.014033.2953 | 15/430,002 published as 2018/0232995 | THIRD PARTY ACTIVITY PERFORMANCE CROSS ENTITY INTEGRATION | Concurrently herewith |
| 7631US1.014033.2955 | 15/430,000 published as 2018/0232213 | CUSTOMIZED INTERACTION MANIPULATION AND IMPLEMENTATION FOR RESOURCE STORAGE | Concurrently herewith |
| 7632US1.014033.2956 | 15/430,028 published as 2018/0232672 | RESOURCE ALLOCATION INTERFACE FOR INTERACTIVE RESOURCE DISTRIBUTION | Concurrently herewith |

The invention claimed is:

1. A system for location-based trafficking for resource accumulation, the system comprising:
a memory device; and
one or more processing devices operatively coupled to the memory device, wherein the one or more processing devices are configured to execute computer-readable program code to:
provide a resource accumulation application to a user for installation on a mobile device of the user;
receive transaction history data of the user;
identify, based on the transaction history data of the user, a known merchant that the user has previously interacted with, wherein the known merchant is associated with a promotional program of a managing entity;
in response to identifying the known merchant, transmit a notification to the mobile device of the user, wherein the notification comprises an indication that a virtual token is available at a resource location, wherein the resource location is a geographical location associated with the known merchant;
monitor location data of the mobile device to determine a location of the mobile device;
determine, based on monitoring the location data, that the mobile device is within a predetermined distance of the resource location;
in response to determining that the mobile device is within the predetermined distance of the resource location, automatically transmit a token alert across a wireless network to the mobile device of the user, wherein the token alert activates the resource accumulation application, causing a user interface of the mobile device to display an augmented reality environment of a camera display that includes a virtual token virtually positioned at a predetermined distance and orientation from the mobile device, wherein displaying the augmented reality environment of the camera display further comprises:
causing the mobile device of the user to monitor a camera feed associated with the camera display for a physical triggering symbol; and
in response to identifying the physical triggering symbol, causing the camera display to include the virtual token;
receive, from the mobile device of the user, an indication of a selection of the virtual token; and
in response to receiving the indication of the selection of the virtual token, apply the virtual token to a resource accumulation account of the user.

2. The system of claim 1, wherein the one or more processing devices are further configured to execute computer-readable program code to:
receive an indication of a new transaction between the user and the known merchant; and
in response to receiving the indication of the new transaction, automatically transmit the token alert across the wireless network to the mobile device of the user, wherein the token alert activates the resource accumulation application, causing the user interface of the mobile device to display the augmented reality environment of the camera display that includes the virtual token, wherein the virtual token is associated with an additional value based on the new transaction.

3. The system of claim 1, wherein the one or more processing devices are further configured to execute computer-readable program code to:
in response to determining that the mobile device of the user is within the predetermined distance of the resource location, automatically transmit a resource alert across the wireless network to the mobile device of the user, wherein the resource alert activates the resource accumulation application, causing the user interface of the mobile device to display a selectable notification of a close proximity to the virtual token;
receive, from the mobile device of the user, an indication of a selection of the selectable notification of the close proximity to the virtual token; and
in response to receiving the indication of the selection, automatically transmit the token alert across the wireless network to the mobile device of the user.

4. The system of claim 1, wherein the virtual token comprises a coin, an emblem, a ticket, a coupon, or a virtual representation of at least a portion of a goal.

5. A computer program product for location-based trafficking for resource accumulation, the computer program product comprising at least one non-transitory computer readable medium comprising computer readable instructions, the instructions comprising instructions for:
providing a resource accumulation application to a user for installation on a mobile device of the user;
receiving transaction history data of the user;
identifying, based on the transaction history data of the user, a known merchant that the user has previously interacted with, wherein the known merchant is associated with a promotional program of a managing entity;
in response to identifying the known merchant, transmitting a notification to the mobile device of the user, wherein the notification comprises an indication that a virtual token is available at a resource location, wherein the resource location is a geographical location associated with the known merchant;
monitoring location data of the mobile device to determine a location of the mobile device;
determining, based on monitoring the location data, that the mobile device is within a predetermined distance of the resource location;
in response to determining that the mobile device is within the predetermined distance of the resource location, automatically transmit a token alert across a wireless network to the mobile device of the user, wherein the token alert activates the resource accumulation application, causing a user interface of the mobile device to display an augmented reality environment of a camera display that includes a virtual token virtually positioned at a predetermined distance and orientation from the mobile device, wherein displaying the augmented reality environment of the camera display further comprises:
  causing the mobile device of the user to monitor a camera feed associated with the camera display for a physical triggering symbol; and
  in response to identifying the physical triggering symbol, causing the camera display to include the virtual token;
receiving, from the mobile device of the user, an indication of a selection of the virtual token; and
in response to receiving the indication of the selection of the virtual token, apply the virtual token to a resource accumulation account of the user.

6. The computer program product of claim 5, wherein the computer readable instructions further comprise instructions for:
receiving an indication of a new transaction between the user and the known merchant; and
in response to receiving the indication of the new transaction, automatically transmitting the token alert across the wireless network to the mobile device of the user, wherein the token alert activates the resource accumulation application, causing the user interface of the mobile device to display the augmented reality environment of the camera display that includes the virtual token, wherein the virtual token is associated with an additional value based on the new transaction.

7. The computer program product of claim 5, the computer readable instructions further comprise instructions for:
in response to determining that the mobile device of the user is within the predetermined distance of the resource location, automatically transmitting a resource alert across the wireless network to the mobile device of the user, wherein the resource alert activates the resource accumulation application, causing the user interface of the mobile device to display a selectable notification of a close proximity to the virtual token;
receiving, from the mobile device of the user, an indication of a selection of the selectable notification of the close proximity to the virtual token; and
in response to receiving the indication of the selection, automatically transmitting the token alert across the wireless network to the mobile device of the user.

8. The computer program product of claim 5, wherein the virtual token comprises a coin, an emblem, a ticket, a coupon, or a virtual representation of at least a portion of a goal.

9. A computer implemented method for location-based trafficking for resource accumulation, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:
  provide a resource accumulation application to a user for installation on a mobile device of the user;
  receive transaction history data of the user;
  identify, based on the transaction history data of the user, a known merchant that the user has previously interacted with, wherein the known merchant is associated with a promotional program of a managing entity;
  in response to identifying the known merchant, transmit a notification to the mobile device of the user, wherein the notification comprises an indication that a virtual token is available at a resource location, wherein the resource location is a geographical location associated with the known merchant;
  monitor location data of the mobile device to determine a location of the mobile device;
  determine, based on monitoring the location data, that the mobile device is within a predetermined distance of the resource location;
  in response to determining that the mobile device is within the predetermined distance of the resource location, automatically transmit a token alert across a wireless network to the mobile device of the user, wherein the token alert activates the resource accumulation application, causing a user interface of the mobile device to display an augmented reality environment of a camera display that includes a virtual token virtually positioned at a predetermined distance and orientation from the mobile device, wherein displaying the augmented reality environment of the camera display further comprises:
    causing the mobile device of the user to monitor a camera feed associated with the camera display for a physical triggering symbol; and
    in response to identifying the physical triggering symbol, causing the camera display to include the virtual token;
  receive, from the mobile device of the user, an indication of a selection of the virtual token; and
  in response to receiving the indication of the selection of the virtual token, apply the virtual token to a resource accumulation account of the user.

10. The computer implemented method of claim 9, wherein said configured computer program instruction code is further configured such that when said instruction code is operated by said computer processing device, said computer processing device performs the following operations:
receive an indication of a new transaction between the user and the known merchant; and
in response to receiving the indication of the new transaction, automatically transmit the token alert across the wireless network to the mobile device of the user, wherein the token alert activates the resource accumulation application, causing the user interface of the mobile device to display the augmented reality environment of the camera display that includes the virtual token, wherein the virtual token is associated with an additional value based on the new transaction.

11. The computer implemented method of claim 9, wherein said configured computer program instruction code is further configured such that when said instruction code is operated by said computer processing device, said computer processing device performs the following operations:

in response to determining that the mobile device of the user is within the predetermined distance of the resource location, automatically transmit a resource alert across the wireless network to the mobile device of the user, wherein the resource alert activates the resource accumulation application, causing the user interface of the mobile device to display a selectable notification of a close proximity to the virtual token;

receive, from the mobile device of the user, an indication of a selection of the selectable notification of the close proximity to the virtual token; and in response to receiving the indication of the selection, automatically transmit the token alert across the wireless network to the mobile device of the user.

12. The computer implemented method of claim 9, wherein:

causing the user interface of the mobile device to display the augmented reality environment of the camera display that includes the virtual token virtually positioned at the predetermined distance and orientation from the mobile device further comprises overlaying the virtual token within the augmented reality environment; and receiving the indication of the selection of the virtual token comprises receiving an indication that a user input associated with a location of the virtual token has been received by a touch screen portion of the user interface of the mobile device.

13. The system claim 1, wherein:

causing the user interface of the mobile device to display the augmented reality environment of the camera display that includes the virtual token virtually positioned at the predetermined distance and orientation from the mobile device further comprises overlaying the virtual token within the augmented reality environment; and receiving the indication of the selection of the virtual token comprises receiving an indication that a user input associated with a location of the virtual token has been received by a touch screen portion of the user interface of the mobile device.

14. The computer program product of claim 5, wherein:

causing the user interface of the mobile device to display the augmented reality environment of the camera display that includes the virtual token virtually positioned at the predetermined distance and orientation from the mobile device further comprises overlaying the virtual token within the augmented reality environment; and receiving the indication of the selection of the virtual token comprises receiving an indication that a user input associated with a location of the virtual token has been received by a touch screen portion of the user interface of the mobile device.

15. The system of claim 1, wherein the physical triggering symbol comprises one or more of a code, a sequence, an image, an icon, a sticker, and a text.

16. The computer program product of claim 5, wherein the physical triggering symbol comprises one or more of a code, a sequence, an image, an icon, a sticker, and a text.

17. The computer implemented method of claim 9, wherein the physical triggering symbol comprises one or more of a code, a sequence, an image, an icon, a sticker, and a text.

* * * * *